United States Patent
Deller et al.

(10) Patent No.: US 10,332,252 B2
(45) Date of Patent: Jun. 25, 2019

(54) SLOPE CONSTRAINED CUBIC INTERPOLATION

(71) Applicant: General Electric Company, Schenectady, NY (US)

(72) Inventors: Timothy Wayne Deller, Elm Grove, WI (US); Floribertus Heukensfeldt Jansen, Ballston Lake, NY (US); Pal Csongor Sprencz, Budapest (HU)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/394,638

(22) Filed: Dec. 29, 2016

(65) Prior Publication Data

US 2018/0189984 A1    Jul. 5, 2018

(51) Int. Cl.
G06T 5/00 (2006.01)
G06T 7/00 (2017.01)
G06T 11/00 (2006.01)
G06T 5/20 (2006.01)

(52) U.S. Cl.
CPC ............ *G06T 7/0012* (2013.01); *G06T 5/002* (2013.01); *G06T 5/20* (2013.01); *G06T 11/008* (2013.01); *G06T 2207/10104* (2013.01); *G06T 2207/30004* (2013.01)

(58) Field of Classification Search
CPC combination set(s) only.
See application file for complete search history.

(56) References Cited

U.S. PATENT DOCUMENTS

| 5,148,499 A * | 9/1992 | Matsumura | G01R 33/56 378/901 |
| 6,084,980 A * | 7/2000 | Nguyen | B33Y 10/00 264/401 |
| 6,687,393 B1 * | 2/2004 | Skinner, Jr. | G06T 15/08 345/424 |
| 6,982,710 B2 * | 1/2006 | Salomie | G06T 17/20 345/420 |
| 8,135,186 B2 * | 3/2012 | Bouman | G06T 11/006 378/19 |
| 8,620,041 B2 * | 12/2013 | Arnon | A61B 5/015 382/128 |

(Continued)

FOREIGN PATENT DOCUMENTS

| EP | 2248480 A1 | 11/2010 |
| WO | 2012092275 A1 | 7/2012 |
| WO | 2015073871 A2 | 5/2015 |

OTHER PUBLICATIONS

"Catheter Ablation," UCSF Medical Center, Available Online at www.ucsfhealth.org/treatments/catheter_ablation/, As Updated Oct. 29, 2010, 1 page.

(Continued)

*Primary Examiner* — Tsung Yin Tsai
(74) *Attorney, Agent, or Firm* — McCoy Russell LLP

(57) ABSTRACT

Methods and systems are provided for interpolating acquired data of a tracer distribution. In one embodiment, a method comprises reconstructing the acquired data, and interpolating the reconstructed data with a surface, wherein a slope of the surface at a data point of the reconstructed data is limited by a value of the data point. In this way, interpolation artifacts around objects with high tracer density may be avoided.

17 Claims, 5 Drawing Sheets

(56) References Cited

U.S. PATENT DOCUMENTS

| | | | |
|---|---|---|---|
| 8,702,688 B2 | 4/2014 | Melsky | |
| 2005/0111713 A1* | 5/2005 | Jerebko | G06T 7/0012 382/128 |
| 2005/0196041 A1* | 9/2005 | Jerebko | G06K 9/4609 382/173 |
| 2008/0143718 A1* | 6/2008 | Ray | G06K 9/4638 345/424 |
| 2008/0200840 A1* | 8/2008 | Tamez-Pena | A61B 5/055 600/587 |
| 2010/0014733 A1* | 1/2010 | Vija | G06T 5/50 382/131 |
| 2010/0153024 A1* | 6/2010 | Potze | G01B 11/24 702/36 |
| 2013/0034276 A1* | 2/2013 | Hibbard | G06T 17/30 382/128 |
| 2013/0127902 A1* | 5/2013 | Zhu | G06T 7/136 345/620 |
| 2013/0230230 A1* | 9/2013 | Ajemba | G06T 7/0012 382/133 |
| 2013/0343673 A1* | 12/2013 | Pal | G06T 11/003 382/298 |
| 2014/0221993 A1 | 8/2014 | Bertolero et al. | |

OTHER PUBLICATIONS

"FAQ: Electrophysiology Study and Catheter Ablation," UCSF Medical Center, Available Online at https://www.ucsfhealth.org/education/electrophysiology_study_and_catheter_ablation, As Updated Jan. 20, 2011, 2 pages.

"Electrophysiology Procedure," UCSF Medical Center, Available Online at https://www.ucsfhealth.org/education/electrophysiology_procedure/, Available as Early as Nov. 16, 2012, 2 pages.

"Cardiac ablation procedures," MedlinePlus Medical Encyclopedia, Available Online at https://medlineplus.gov/ency/article/007368.htm, As Updated Oct. 26, 2014, 4 pages.

Koutalas, E. et al., "Contemporary Mapping Techniques of Complex Cardiac Arrhythmias—Identifying and Modifying the Arrhythmogenic Substrate," Arrhythmia & Electrophysiology Review, vol. 4, No. 1, May 2015, Published Online Jan. 12, 2015, 9 pages.

Keys, R., "Cubic Convolution Interpolation for Digital Image Processing," IEEE Transactions on Acoustics, Speech, and Signal Processing, vol. ASSP-29, No. 6, Dec. 1981, 8 pages.

Kruger, C., "Constrained Cubic Spline Interpolation for Chemical Engineering Applications," Korf Technology Website Article, Available Online at http://www.korf.co.uk/spline.pdf, Available as Early as Dec. 8, 2002, 5 pages.

"Bicubic interpolation," Wikipedia Website, Available Online at https://en.wikipedia.org/wiki/Bicubic_interpolation, Website Available as Early as Jan. 14, 2005, 5 pages.

Kokes, J. et al., "Using Constrained Cubic Spline Instead of Natural Cubic Spline to Eliminate Overshoot and Undershoot in the HHT," Annals of the Faculty of Engineering Hunedoara—International Journal of Engineering, vol. 9, No. 3, Sep. 2011, 6 pages.

Ross, S., "Q.Clear," GE Healthcare Whitepaper, Available Online at http://www3.gehealthcare.com/~/media/documents/us-global/products/pet-ct/whitepaper/q%20clear/ge-healthcare-white-paper_qclear.pdf, Available as Early as Jan. 1, 2014, 9 pages.

* cited by examiner

SLOPE CONSTRAINED CUBIC INTERPOLATION

FIELD

Embodiments of the subject matter disclosed herein relate to image processing and more particularly, to interpolating imaging data with slope constrained cubic interpolation.

BACKGROUND

Positron emission tomography (PET) generates data that represent the distribution of positron-emitting nuclides, or tracers, within the body of a patient. The distribution of the tracers may indicate the physiological function properties of the patient's organ. Data acquired from a PET scanner may undergo tomographic reconstruction before being displayed to a user.

In order to visualize a specific region of the patient's body, the reconstructed PET data may be interpolated to generate a localized image. However, traditional interpolation methods may be disadvantageous for interpolating reconstructed PET data, especially when interpolating PET data reconstructed with edge-preserving regularized reconstruction method. For example, interpolation methods such as nearest point interpolation and linear interpolation may degrade image resolution and blur the edges of imaging objects. Other interpolation method such as cubic interpolation may preserve the image resolution. However, cubic interpolation may introduce artifacts around high contrast imaging object. For example, cubic interpolation may generate negative values around the sharp, high contrast object in the PET image. As such, when the interpolated PET image is displayed in gray scale, the negative values introduces artifact adjacent to the high contrast object.

BRIEF DESCRIPTION

In one embodiment, a method comprises acquiring medical imaging data, reconstructing the acquired data, interpolating the reconstructed data with a surface, and generating an image based on the interpolation. During interpolation, a slope of the surface at a data point of the reconstructed data is limited by a value of the data point. In this way, image resolution may be preserved after interpolation, and artifacts around high contrast object may be avoided.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 3:
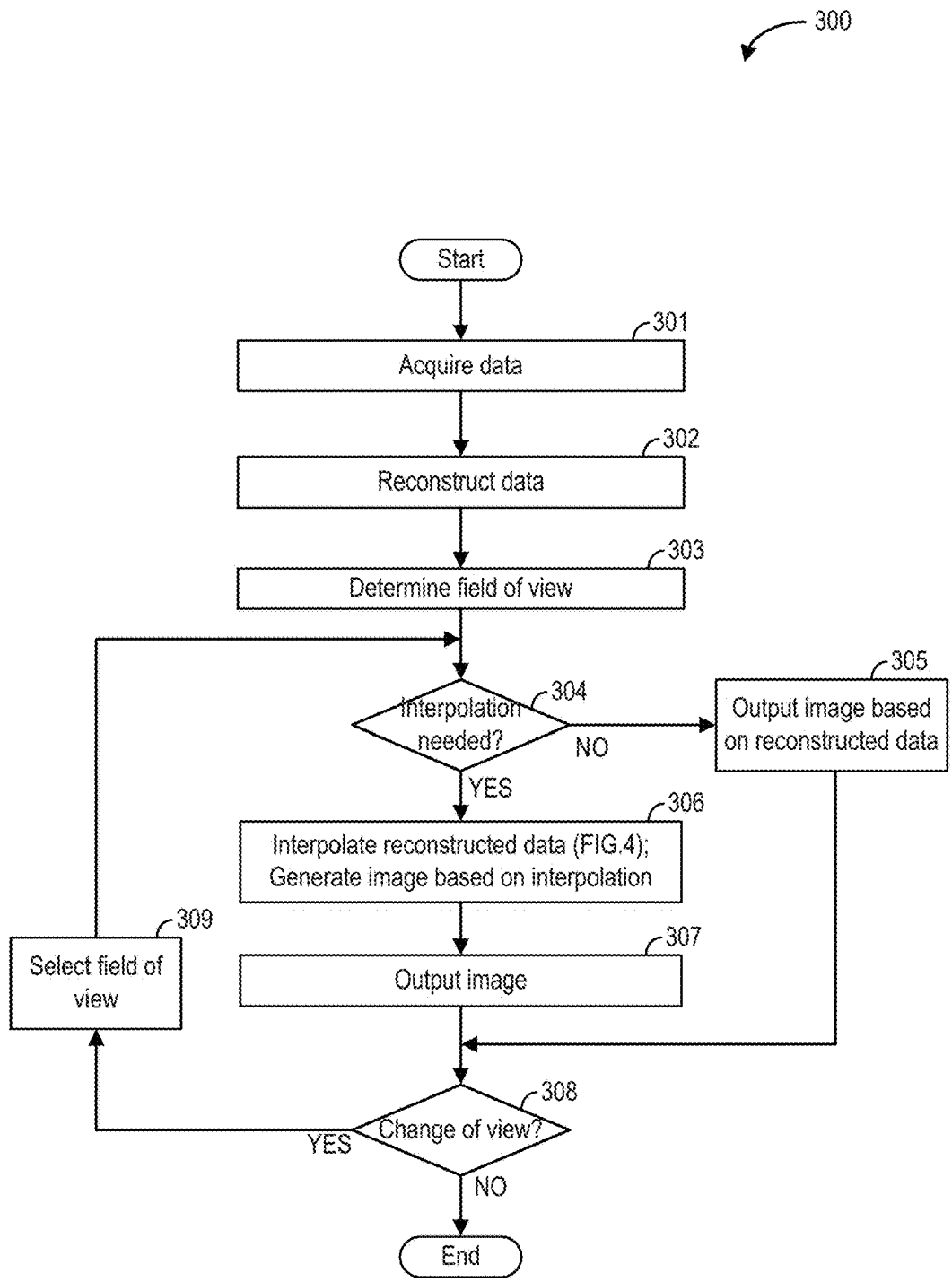
FIG. 3 shows an example method of generating PET image.
Figure 4:
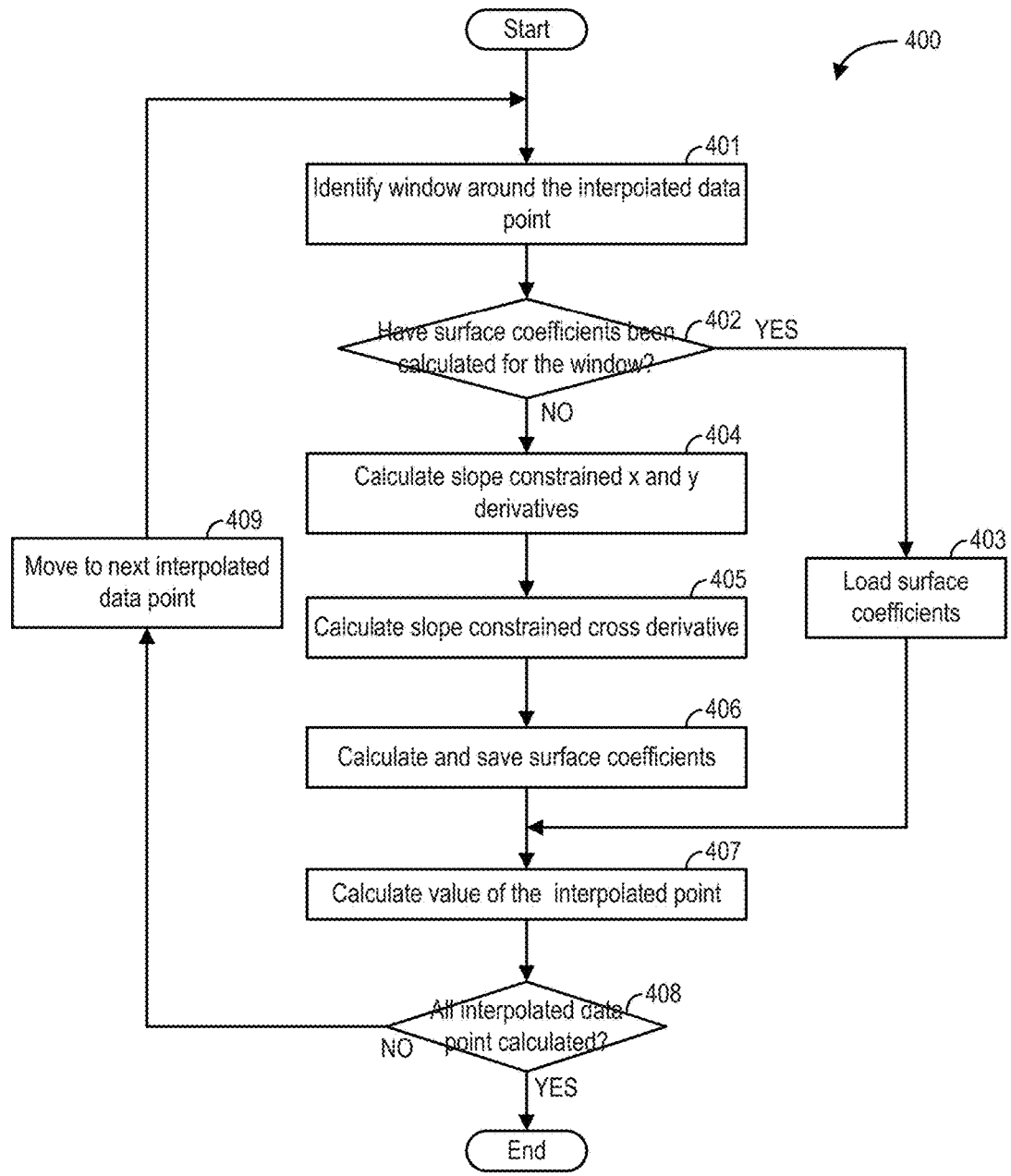
FIG. 4 shows an example method of interpolating reconstructed PET data.
Figure 5:
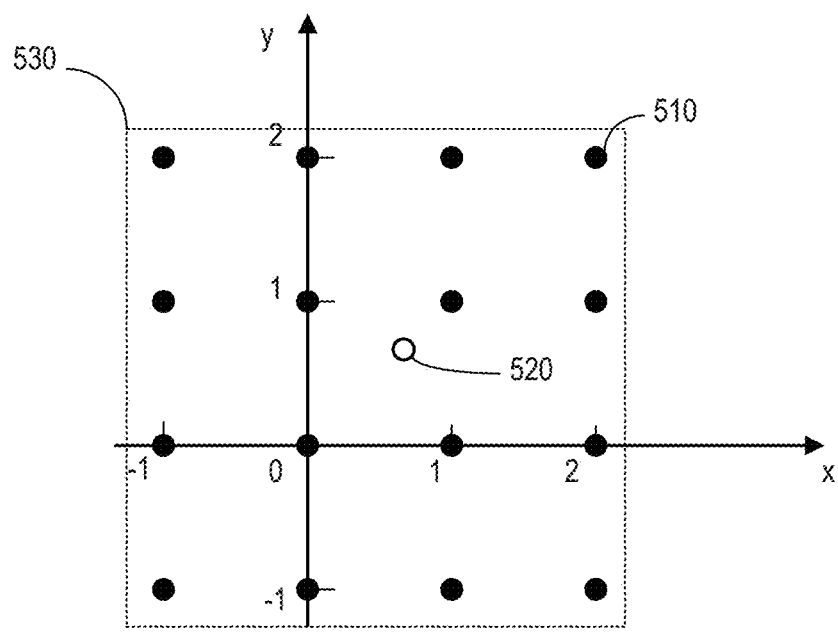
FIG. 5 illustrates generating value for an interpolated data point based on surrounding reconstructed data points.

The following description relates to various embodiments for generating an image acquired by an imaging system. In particular, systems and methods are provided for generating an image based on medical imaging data acquired from an imaging system, such as imaging system shown in FIGS. 1A-1B. As an example, the medical imaging data may be PET data of tracer distribution. When displaying reconstructed PET data in a user-selected field of view, interpolation is required. Traditional linear and cubic interpolations may blur the image or introduce artifact around high contrast object, as shown in FIGS. 2A-2D. FIG. 3 shows an example method of generating an image based on the acquired PET data. As shown in FIG. 5, value of each interpolated data point of the image may be calculated based on the value of surrounding reconstructed PET data points via a slope constrained cubic interpolation method. Example procedures of the slope constrained cubic interpolation is shown in FIG. 4.

Though a PET system is described by way of example, it should be understood that the present techniques may also be useful when applied to medical images acquired using other imaging modalities, such as CT, tomosynthesis, MRI, C-arm angiography, and so forth. The present discussion of a PET imaging modality is provided merely as an example of one suitable imaging modality.

Figure 1A:
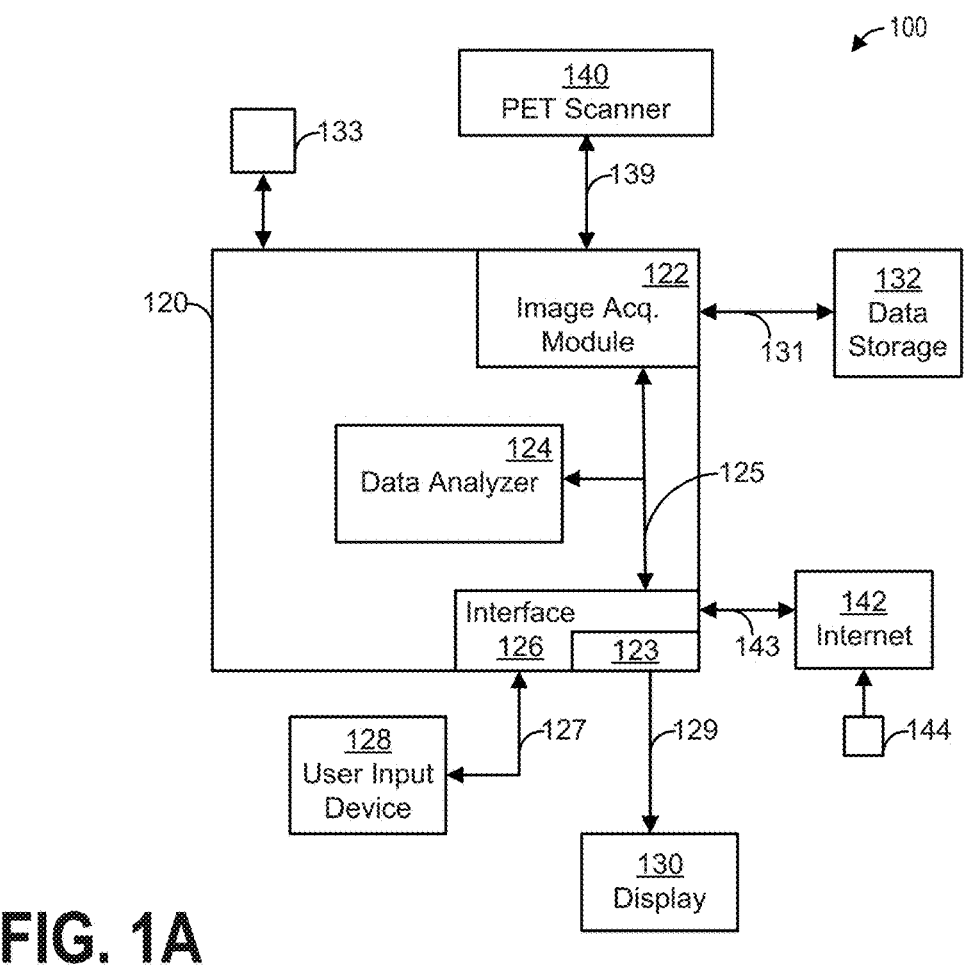
FIG. 1A shows an example imaging system.

FIG. 1A shows a system 100 for clinical diagnosis of a subject according to an embodiment of the present invention. The system 100 includes a data processing apparatus 120 that comprises various interfaces 123, 126, an image acquisition module 122, and a data analyzer 124. The interfaces 123, 126, image acquisition module 122, and data analyzer 124 can be logically coupled together by way of a data bus 125 under the control of a central processing unit (not shown).

The data processing apparatus 120 provides a first general purpose interface 126 for interfacing the data processing apparatus 120 to external components. In this embodiment, the external components include: an input data link 127 coupled to at least one user input device 128 (e.g. a mouse/keyboard/etc.), a network data link 143 coupled to the Internet 142, and a display data link 129 coupled to a display 130. Additionally, the general purpose interface 126 also provides a GUI 123 through which a user of the system 100 can input data, commands etc., and receive visual information by viewing the display 130.

The GUI 123 may be operable to generate a two- and/or three-dimensional representation of various anatomical portions of the subject. Such representations may, for example, include color coding of regions according to uptake or use of a substance in respective of those regions. This provides ease of visualization for users of the system 100. In addition, in various embodiments, a user can also rotate images and/or slice 3D images by manipulating the GUI 123 using the input device 128. For example the representations may be representations of acquired image data that is then displayed to the user via the display 130. In another example, the GUI 123 may generate a representation of a one-dimensional respiratory waveform and summary statistics for the respiratory waveform for display on the display 130.

In various embodiments, the data processing apparatus 120 can comprise a general purpose computer, such as, for example, a personal computer (PC). Such a general purpose computer can use software modules to provide both the image acquisition module 122 and the data analyzer 124, and hence can be implemented by upgrading the functional capability of existing equipment using software upgrades. For example, a computer program product 144, comprising computer code, may be transmitted from a remote server (not shown) via the Internet 142 to the data processing apparatus 120 through the network data link 143 or may be provided on a physical medium, such as, for example, a CD, DVD, magnetic disk, ROM, flash memory device, etc.

The system 100 may comprise a positron emission tomography (PET) scanner 140 coupled to the data processing apparatus 120 by a data link 139, and an optional data storage device 132 coupled to the data processing apparatus 120 by a data link 131. The PET scanner 140 and/or the data storage device 132 may be configured to acquire and provide data to the image acquisition module 122. As one example, the data may be referred to herein as pre-image data or imaging data and is defined as data that is acquired with the PET scanner 140, and is then used to create an image for display to a user. For example, where no PET scanner is provided, data could be provided from the data storage device 132 that may contain previously generated data (acquired from a molecular imaging device) stored therein. Such previously generated data could be generated remotely from the system 100 (e.g. in a remote hospital, etc. where suitable image data generation facilities are available), and subsequently transferred to the data storage device 132 from where it can be retrieved by the image acquisition module 122. The image acquisition module 122 is further operable to transfer data generated by the PET scanner 140 to the data storage device 132 for archiving purposes. In alternate embodiments, a different imaging apparatus (other than the PET scanner 140) may be coupled to the data processing apparatus 120 via the data link 139. For example, the different imaging apparatus may include a CT scanner, a MRI apparatus, or the like.

The data analyzer 124 is operable to perform numerical analysis on acquired data. Such data can be provided in the form of a sequence of data frames, corresponding, for example, to a temporal sequence of coincidence events (PET) derived from a certain portion of a subject's anatomy. For example, the data frames may correspond to a time sequence of coincidence events showing the uptake of a radio-isotope tagged molecule in a subject's brain, heart, etc. derived from a PET scan. The data analyzer 124 may perform data analysis either in real time, on coincidence data received from the PET scanner 140, or perform data analysis on previously acquired and stored data (e.g., data stored in the data store 132).

Figure 1B:
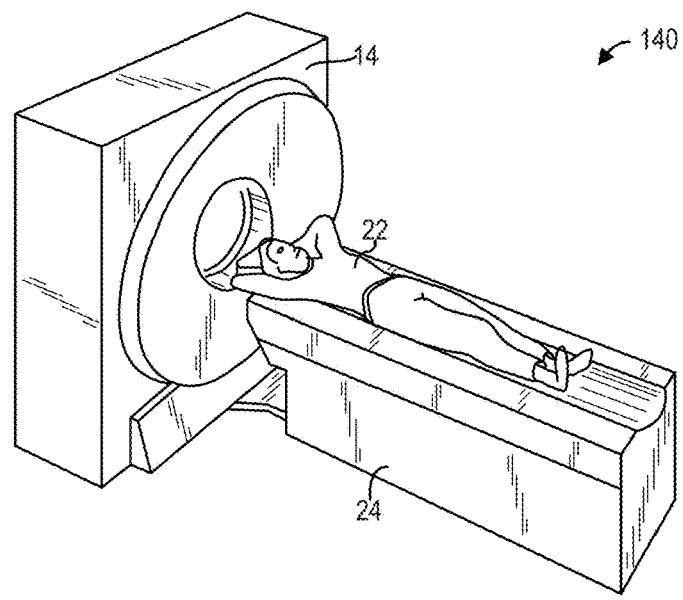
FIG. 1B shows an example PET scanner of the imaging system of FIG. 1A.

FIG. 1B shows one embodiment of the PET scanner 140. The PET scanner 140 includes a detector ring assembly (not shown) inside gantry 14 including a plurality of detector crystals. The detector ring assembly includes a central opening, in which an object or patient, such as patient 22, may be positioned using, for example, a motorized table 24. The motorized table 24 is aligned with the central axis of detector ring assembly. The scanning operation of the PET scanner may be controlled by the data processing apparatus 120 of FIG. 1A.

Figure 2C:
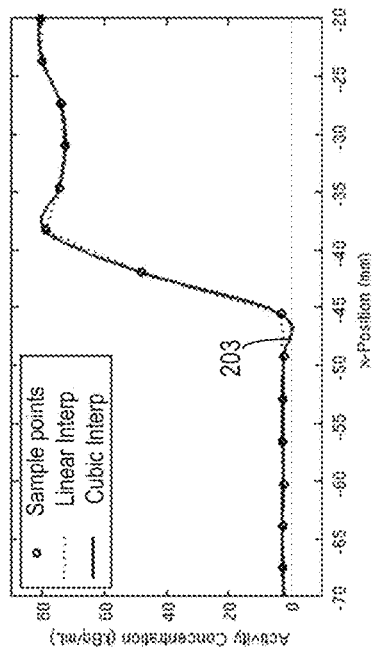
FIG. 2C shows data value along one line of FIG. 2A and FIG. 2B.
Figure 2D:
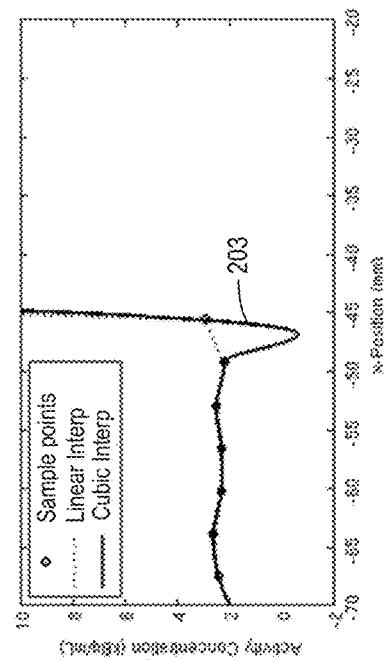
FIG. 2D shows the same data of FIG. 2C plotted in a different range.
Figure 2A:
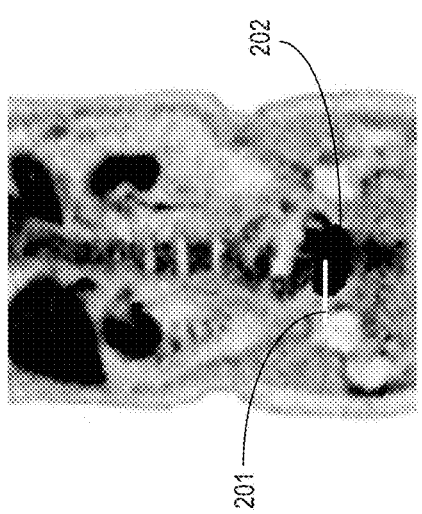
FIG. 2A shows a PET image processed with linear interpolation.
Figure 2B:
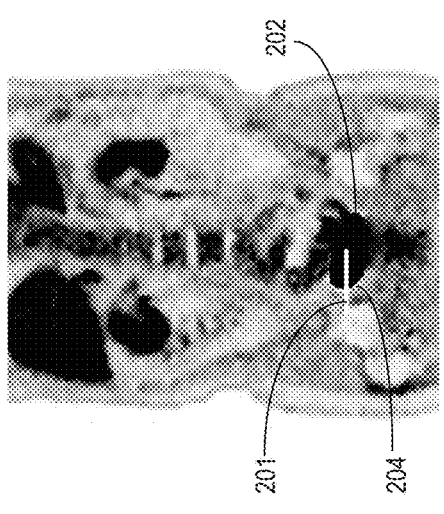
FIG. 2B shows a PET image of the same PET data of FIG. 2A, processed with cubic interpolation.

FIGS. 2A-2D illustrate drawbacks of interpolating the PET data with traditional linear and cubic interpolation methods. Specifically, linear interpolation degrades image resolution, while cubic interpolation introduces artifacts around high contrast object. FIGS. 2A and 2B are PET images plotted from the same reconstructed PET dataset. FIG. 2A is processed with linear interpolation, and FIG. 2B is processed with cubic interpolation. Comparing to FIG. 2A, edges of FIG. 2B is sharper, in other words, FIG. 2B has a better resolution. However, cubic interpolation introduces white edge 204 adjacent to bladder 202 in FIG. 2B, which is not present in FIG. 2A.

FIG. 2C shows tracer concentration along line 201 of FIGS. 2A and 2B. Line 201 crosses the edge of the bladder 202. Original sample points of the reconstructed PET data is shown in round dots. The original sample points are non-negative. At x-position of −45 mm, the value of the sample point significantly increases comparing to the sample point at x-position of −51 mm. The high data value is caused by high tracer uptake in the bladder. Linear interpolation of the sample points is shown in dashed line, and cubic interpolation is shown in solid line. Due to the steep slope of the sample points between x-positions from −50 mm to −40 mm, cubic interpolation introduces a negative overshoot 203. When plotting the interpolated image above zero concentration in gray scale, the negative values are assigned with white color. Thus, white overshoot artifact appears outside and adjacent to the bladder 202. The artifact may cause confusion to the user, and affect diagnosis of lesion close to the bladder.

The white overshoot artifact may be more prominent in PET imaging. In order to visualize small accumulation of tracers in the patient body, PET images may be displayed with a narrow range. When viewing in a narrower range, the contrast between the overshoot artifact and the PET signal with diagnostic value may appear stronger. For example, FIG. 2D shows the same data of FIG. 2C in a narrower range of 0-10 kBq/mL comparing to FIG. 2C. The overshoot artifact 203 is more prominent comparing to the same artifact shown in FIG. 2C.

FIG. 3 shows an example method 300 of generating images with medical imaging data acquired by an imaging system, such as the imaging system shown in FIG. 1A. As an example, the medical imaging data may be PET data of tracer distribution acquired with a PET scanner (such as PET scanner 140 of FIG. 1B). The PET data may then be processed with a processing apparatus (such as processing apparatus 120 of FIG. 1A) and displayed to a user as an image.

At 301, method 300 acquires data from the imaging system. As an example, the imaging data may be distribution of tracers in a patient's body, which are detected by recording photon coincidence events with the PET scanner.

At 302, method 300 reconstructs an image from the acquired PET data. The image may be reconstructed using an image reconstruction algorithm, including but not limited to analytic reconstruction algorithms (e.g., filtered back projection), iterative reconstruction algorithms, and edge-preserving regularized reconstruction. In some examples, noise and artifact reduction algorithms may be applied to the acquired PET data prior to reconstruction. In one example, the reconstructed data are non-negative. In another example, the reconstructed data are not smoothed.

At 303, a field of view is selected by a user. The field of view may be a two dimensional window surrounding an area of diagnostic interest. In another example, the field of view may be a three dimensional window.

At 304, method 300 determines if interpolation is required. As an example, interpolation may be needed if grid size of the interpolated image is different from the grid size of the reconstructed data. As another example, interpolation may be required if the resolution of the display is higher than the reconstructed data. If method 300 determines that interpolation is required, method 300 moves to 306. Otherwise, method 300 moves to 305 to output an image based on the reconstructed data without interpolation.

At 305, the image may be saved in a data storage device (such as data storage device 132 of FIG. 1A). In another example, the image may be displayed to a user through a display device (such as display 130 of FIG. 1A).

At 306, the reconstructed data within the field of view may be interpolated with slope constrained cubic interpolation, and an interpolated image may be generated based on the interpolated data points. As an example, the value of the interpolated data points may be assigned with a color (or gray scale) and form the interpolated image. The slope constrained cubic interpolation does not include feature preserving methods. The features preserving methods may include feature or edge identification algorithm. These methods may require multiple tuning parameters that are difficult to tune for a wide range of inputs. Detailed procedures of slope constrained cubic interpolation are presented in FIG. 4.

At 307, the interpolated image may be output to the display device (such as display 130 of FIG. 1A) for the user. The interpolated image may also be saved in the data storage device (such as data storage device 132 of FIG. 1A).

At 308, based on the user input, method 300 determines whether to change the field of view. As one example, method 300 may change the field of view if the user zooms in or out of current field of view. As another example, method 300 may change the field of view if the user selected a new region of interest. If the field of view is changed, method 300 moves to 309 to select a new field of view based on the user input. If the field of view remains the same, method 300 exits.

FIG. 4 shows an example method 400 of interpolating reconstructed data with slope constrained cubic interpolation. Herein, two-dimensional reconstructed data (such as a two-dimensional image) are interpolated as an example. The method may also be applied to data with higher dimension.

At 401, a window is identified around an interpolated data point. The interpolated data point locates in the field of view. For example, as shown in FIG. 5, window 530 comprises four-by-four reconstructed data points (or pixels of the image) 510. By selecting a small window size, only local information is affected by the interpolation. The interpolated data point 520 locates within the window. The x and y axes are arbitrary axes defined by the window. In other words, when calculating the value of a different interpolated data point, both the window and the axes are moved to another location. The goal of the interpolation process is to generate the value of the interpolated data point 520 based on the value of the reconstructed data points 510 within the window. Specifically, the value of the reconstructed data points 510 are interpolated with a surface, and the value of the interpolated data point 520 is then calculated based on the surface. For example, the surface may be a slope-limited bicubic spline. The interpolated surface p(x, y) may be expressed as:

$$p(x,y)=\Sigma_{i=0}^{3}\Sigma_{i=0}^{3}a_{ij}x^{i}y^{j},  \quad \text{Equation 1}$$

wherein $a_{ij}$ are the coefficients of the surface. The coefficients of the surface may alternatively be expresses as vector $\alpha$:

$$\alpha=[a_{00}a_{10}a_{20}a_{30}a_{01}a_{11}a_{21}a_{31}a_{02}a_{12}a_{22}a_{32}a_{03}a_{13}a_{23}a_{33}]^{T}. \quad \text{Equation 2}$$

As such, when vector $\alpha$ is known, the value of the interpolated data point 520 may be calculated based on its location (such as x and y coordinates) relative to the window 530.

Turning back to FIG. 4, at 402, method 400 determines whether surface coefficients have been calculated for current window 530. If surface coefficients have been calculated in the previous interpolation process, method 400 moves to 403, wherein the saved surface coefficients are loaded from the memory. If surface coefficients are not available for current window 530, method 400 moves to 404.

At 404, slope constrained partial derivatives at the reconstructed data point are calculated. The partial derivatives include x and y derivatives. As one example, x and y derivatives may first be calculated according to the following equations:

$$f_x(x, y) = \left| \frac{f(x+1, y) - f(x-1, y)}{2} \right|, \quad \text{Equation 3}$$

$$f_y(x, y) = \left| \frac{f(x, y+1) - f(x, y-1)}{2} \right|,$$

$$x \in \{0, 1\}, y \in \{0, 1\},$$

wherein function $f(\cdot)$ are the values of the reconstructed data points; $f_x(\cdot)$ and $f_y(\cdot)$ are x and y derivatives, respectively.

Thresholds of the partial derivatives are then calculated. In one embodiment, the threshold may be defined as:

$$f_x^{lim}(x,y)=2f(x,y)-\min\{f(x-1,y),f(x,y),f(+1,y)\},$$

$$f_y^{lim}(x,y)=2f(x,y)-\min\{f(x,y-1),f(x,y),f(x,y+1)\},$$

$$x \in \{0,1\}, y \in \{0,1\}, \quad \text{Equation 4}$$

wherein $f_x^{lim}(\cdot)$ and $f_y^{lim}(\cdot)$ are the thresholds for x and y derivative, respectively. The threshold is determined based on the value of the data point and data points next to the data point in the x or y direction of the window.

The slope constrained partial derivatives may be calculated based on the thresholds of the partial derivatives:

$$f_x^s(x,y)=\min\{f_x(x,y),f_x^{lim}(x,y)\},$$

$$f_y^s(x,y)=\min\{f_y(x,y),f_y^{lim}(x,y)\},$$

$$x \in \{0,1\}, y \in \{0,1\}, \quad \text{Equation 5}$$

wherein $f_x^s(\cdot)$ and $f_y^s(\cdot)$ are the slope constrained x and y derivative, respectively. If the partial derivative is higher than the corresponding threshold, the partial derivative is replaced with the threshold. As such, the threshold of the slope at the reconstructed data point is determined based on the value of the reconstructed data point: the threshold increases with increased value of the reconstructed data point, and decreases with decreased value of the reconstructed data point. For a reconstructed data point with small value, a large partial derivative is replaced with the threshold. In this way, negative values in the interpolated data point may be avoided. Further, original values of the reconstructed data are preserved in the interpolated data.

In another embodiment, the partial derivatives may be limited with a threshold based on image statistics of the reconstructed data. For example, a lower threshold $\lim_{low}$ and an upper threshold $\lim_{upper}$ may be defined as:

$$\lim_{low} = \min\{\text{Image}\} - k \cdot |\max\{\text{Image}\} - \min\{\text{Image}\}|,$$

$$\lim_{upper} = \max\{\text{Image}\} - k \cdot |\max\{\text{Image}\} - \min\{\text{Image}\}|, \quad \text{Equation 6}$$

wherein Image is the reconstructed, un-interpolated PET data in the current field of view, and k is a pre-determined small constant. If the partial derivative is lower than the lower limit, the partial derivative is set to be the lower limit. If the partial derivative is higher than the upper limit, the partial derivative is set to be the upper limit.

At 405, method 400 calculates the slope constrained cross derivative at the reconstructed data point based on the slope constrained partial derivatives calculated at 404. For example, the cross derivative $f_{xy}(x, y)$ may be calculated as follows:

$$f_{xy}(x, y) = \frac{1}{2} \cdot \left( \left| \frac{f_y^s(x+1, y) - f_y^s(x-1, y)}{2} \right| + \left| \frac{f_x^s(x, y+1) - f_x^s(x, y-1)}{2} \right| \right), \quad \text{Equation 7}$$

$$x \in \{0, 1\}, y \in \{0, 1\}.$$

As such, the cross derivative is calculated by taking an average between an x derivative of the slope constrained y derivative $f_y^s(\cdot)$ and a y derivate of the slope constrained x derivative $f_x^s(\cdot)$. The cross derivative may be limited by a threshold. The threshold may be determined based on the value of the reconstructed data point. For example, the threshold of the cross derivative may be proportional to the value of the reconstructed data point. The threshold $f_{xy}^{lim}(x, y)$ for the cross derivative $f_{xy}(x, y)$ may be defined as:

$$f_{xy}^{lim}(x,y) = 2f(x,y). \quad \text{Equation 8}$$

At 406, parameter a is calculated based on a vector x constructed with the value of the reconstructed data point, the slope constrained partial derivatives, and the slope constrained cross derivative at the reconstructed data point. As an example, the vector x may be expressed as:

$$x = [f(0,0), f(1,0), f(0,1), f(1,1), f_x^s(0,0), f_x^s(1,0), f_x^s(0,1), f_x^s(1,1), f_y^s(0,0), f_y^s(1,0), f_y^s(0,1), f_y^s(1,1), f_{xy}^s(0,0), f_{xy}^s(1,0), f_{xy}^s(0,1), f_{xy}^s(1,1)]^T. \quad \text{Equation 9}$$

The vector α may be calculated similar to transitional 2D cubic interpolation based on vector x:

$$\alpha = A^{-1}x, \quad \text{Equation 10}$$

wherein $$A^{-1} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ -3 & 3 & 0 & 0 & -2 & -1 & 0 & 0 & 0 & 0 & 0 & 0 & 0 & 0 & 0 & 0 \\ 2 & -2 & 0 & 0 & 1 & 1 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & -3 & 3 & 0 & 0 & -2 & -1 & 0 & 0 \\ 0 & 0 & 0 & 0 & 0 & 0 & 0 & 0 & 2 & -2 & 0 & 0 & 1 & 1 & 0 & 0 \\ -3 & 0 & 3 & 0 & 0 & 0 & 0 & 0 & -2 & 0 & -1 & 0 & 0 & 0 & 0 & 0 \\ 0 & 0 & 0 & 0 & -3 & 0 & 3 & 0 & 0 & 0 & 0 & 0 & -2 & 0 & -1 & 0 \\ 9 & -9 & -9 & 9 & 6 & 3 & -6 & -3 & 6 & -6 & 3 & -3 & 4 & 2 & 2 & 1 \\ -6 & 6 & 6 & -6 & -3 & -3 & 3 & 3 & -4 & 4 & -2 & 2 & -2 & -2 & -1 & -1 \\ 2 & 0 & -2 & 0 & 0 & 0 & 0 & 0 & 1 & 0 & 1 & 0 & 0 & 0 & 0 & 0 \\ 0 & 0 & 0 & 0 & 2 & 0 & -2 & 0 & 0 & 0 & 0 & 0 & 1 & 0 & 1 & 0 \\ -6 & 6 & 6 & -6 & -4 & -2 & 4 & 2 & -3 & 3 & -3 & 3 & -2 & -1 & -2 & -1 \\ 4 & -4 & -4 & 4 & 2 & 2 & -2 & -2 & 2 & -2 & 2 & -2 & 1 & 1 & 1 & 1 \end{bmatrix}. \quad \text{Equation 11}$$

Step 406 may further include saving surface coefficients (or vector α) in the system memory.

At 407, the value of the interpolated data point (such as interpolated data point 520 of FIG. 5) may be calculated based on surface coefficients according to Equation 1.

At 408, method 400 checks if the values of all of the interpolated data points in current field of view have been calculated. If the answer is YES, method 400 exits. If the answer is NO, method 400 moves to the next interpolated data point and calculates its value.

A technical effect of the disclosure is that the reconstructed PET data may be interpolated preserving the resolution and without introducing negative interpolated data points. Another technical effect of the disclosure is that slope of the interpolated surface is only limited around high contrast object, while the benefits such as high resolution and smoothness of cubic interpolation is preserved for other reconstructed data points that are not subject to the overshoot artifact. Another technical effect of the disclosure is that the slope constrained cubic interpolation may be easily applied with minimal computation or pre-procession of the reconstructed imaging data. For example, the reconstructed data are not smoothed before being interpolated. Further, the slope constrained cubic interpolation preserves sharpness around high contrast objects without any feature preserving interpolation. Another technical effect of the disclosure is that information in the original reconstructed data is preserved by determining the threshold of the slope of the interpolation surface based on the original reconstructed data, and setting the slope to be equal to the threshold if the slope of the interpolation surface exceeding the threshold. Another technical effect of the disclosure is that the slope constrained cubic interpolation only relies on local image information, rather than any global imagine information, such as histogram or global maximum. As such, local imagine information may not be affected by global information. For example, an abnormally high tracer concentration in bladder does not affect interpolation of a small lesion far away from the bladder.

In one embodiment, a method comprises acquiring medical imaging data; reconstructing the acquired data; interpolating the reconstructed data with a surface, a slope of the surface at a data point of the reconstructed data limited by a value of the data point; and generating an image based on the interpolation. In a first example of the embodiment, the method further includes increasing the threshold when the value of the data point increases. A second example of the embodiment optionally includes the first example and further includes setting the slope of the surface to the threshold if the slope of the surface is higher than the threshold. A third example of the embodiment optionally includes one or more of the first and second examples, and further includes, generating the image with coefficients of the surface determined based on a vector x, the vector x including the value of the data point, a partial derivative at the data point, and a cross derivative at the data point. A fourth example of the embodiment optionally includes one or more of the first through third examples, and further includes, selecting a field of view overlapping with the image, and generating a second image based on the coefficients. A fifth example of the embodiment optionally includes one or more of the first through fourth examples, and further includes, wherein the reconstructed data are non-negative. A sixth example of the embodiment optionally includes one or more of the first through fifth examples, and further includes, wherein the reconstructed data are not smoothed, and where the interpolation is performed only after the reconstruction and the image is displayed on a display. A seventh example of the embodiment optionally includes one or more of the first through sixth examples, and further includes, wherein the reconstructed data are interpolated without feature preserving.

In another embodiment, a method comprises acquiring a medical image; generating an interpolated data point by interpolating the image within a window with a surface, a slope of the surface at a data point of the image limited by a threshold based on a value of the data point; and generating a second image with the interpolated data point. In a first example of the embodiment, the method further comprises determining x and y directions relative to the window, wherein the interpolated data is within the window. A second example of the embodiment optionally includes the first example and further includes, limiting a partial derivative along an x direction at the data point with a first threshold, limiting a partial derivative along a y direction at the data point with a second threshold, and limiting a cross derivative at the data point with a third threshold. A third example of the embodiment optionally includes one or more of the first and second examples, and further includes, the cross derivative is an average of a y derivative of the partial derivative along the x direction and an x derivative of the partial derivative along the y direction. A fourth example of the embodiment optionally includes one or more of the first through third examples, and further includes, wherein the third threshold is proportional to the value of the data point. A fifth example of the embodiment optionally includes one or more of the first through fourth examples, and further includes, wherein the first threshold determined based on the value of the data point and data points next to the data point in the x direction of the window. A sixth example of the embodiment optionally includes one or more of the first through fifth examples, and further includes, wherein the second threshold determined based on the value of the data point and data points next to the data point in the y direction of the window. A seventh example of the embodiment optionally includes one or more of the first through sixth examples, and further includes, selecting a field of view and generating the interpolated data within the field of view.

In another embodiment, a system comprises a detector; and a processor configured with executable instructions stored on a non-transitory memory for: acquiring medical imaging data with the detector; reconstructing the acquired data; selecting a field of view; generating an image within the field of view by interpolating the reconstructed data with a surface, a slope of the surface at a data point of the reconstructed data is limited by a threshold based on a value of the data point; and displaying the image to a user. In a first example of the embodiment, the system further comprises configuring the processor for determining the threshold based on a range of the reconstructed data within the field of view. A second example of the embodiment optionally includes the first example and further includes, configuring the processor for setting the slope of the surface to the threshold if the slope is higher than the threshold. A third example of the embodiment optionally includes one or more of the first and second examples, and further includes, wherein the surface is a slope-limited bicubic spline.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A method, comprising:
acquiring medical imaging data;
reconstructing the acquired data;
generating a surface by interpolating the reconstructed data, a slope of the surface at a data point of the reconstructed data limited by a threshold based on a value of the data point;
generating an image based on the generated surface; and
generating the image with coefficients of the surface determined based on a vector x, the vector x including the value of the data point, a partial derivative at the data point, and a cross derivative at the data point.

2. The method of claim 1, further comprising increasing the threshold when the value of the data point increases.

3. The method of claim 1, further comprising setting the slope of the surface to the threshold if the slope of the surface is higher than the threshold.

4. The method of claim 1, further comprising selecting a field of view overlapping with the image, and generating a second image based on the coefficients of the surface.

5. The method of claim 1, wherein the reconstructed data are non-negative.

6. The method of claim 1, wherein the reconstructed data are not smoothed, and where the interpolation is performed only after the reconstruction and the image is displayed on a display.

7. The method of claim 1, wherein the reconstructed data are interpolated without feature preserving effects.

8. A method, comprising:
acquiring a medical image;
generating a surface by interpolating the image within a window, a slope of the surface at a data point of the image limited by a threshold based on a value of the data point;
calculating a value of an interpolated data point based on the generated surface;
generating a second image with the value of the interpolated data point;
determining x and y directions relative to the window, wherein the interpolated data is within the window; and
limiting a partial derivative along the x direction at the data point with a first threshold, limiting a partial derivative along the y direction at the data point with a second threshold, and limiting a cross derivative at the data point with a third threshold.

9. The method of claim 8, wherein the cross derivative is an average of a y derivative of the partial derivative along the x direction and an x derivative of the partial derivative along the y direction.

10. The method of claim 8, wherein the third threshold is proportional to the value of the data point.

11. The method of claim 8, wherein the first threshold is determined based on the value of the data point and data points next to the data point in the x direction of the window.

12. The method of claim 8, wherein the second threshold is determined based on the value of the data point and data points next to the data point in the y direction of the window.

13. The method of claim 8, further comprising selecting a field of view and generating the interpolated data within the field of view.

14. A system, comprising:
a detector; and
a processor configured with executable instructions stored on a non-transitory memory for:
acquiring medical imaging data with the detector;
reconstructing the acquired data;
selecting a field of view;
generating a surface by interpolating the reconstructed data, a slope of the surface at a data point of the reconstructed data limited by a threshold based on a value of the data point;
generating an image based on the generated surface, wherein the image is generated with coefficients of the surface determined based on a vector x, the vector x including the value of the data point, a partial derivative at the data point, and a cross derivative at the data point; and
displaying the image to a user.

15. The system of claim 14, further comprising configuring the processor for determining the threshold based on a range of the reconstructed data within the field of view.

16. The system of claim 14, further comprising configuring the processor for setting the slope of the surface to the threshold if the slope is higher than the threshold.

17. The system of claim 14, wherein the surface is a slope-limited bicubic spline.

* * * * *